United States Patent [19]

Shimizu et al.

[11] 4,297,725
[45] Oct. 27, 1981

[54] METHOD FOR MEASUREMENT OF DISPLACEMENT OF MOVING BODY BY USE OF TARGET MARK AND APPARATUS THEREFOR

[75] Inventors: Ken-Ichi Shimizu, Tokorozawa; Chuji Ikeya, Higashi-Murayama, both of Japan

[73] Assignees: Agency of Industrial Science & Technology; Ministry of International Trade & Industry, both of Tokyo, Japan

[21] Appl. No.: 68,438

[22] Filed: Aug. 21, 1979

[30] Foreign Application Priority Data

Aug. 24, 1978 [JP] Japan .............................. 53-103211

[51] Int. Cl.³ .............................................. H04N 7/18
[52] U.S. Cl. .............................. 358/125; 250/203 CT
[58] Field of Search ..................... 358/107, 125, 126; 250/203 CT

[56] References Cited

U.S. PATENT DOCUMENTS

| | | | |
|---|---|---|---|
| 3,114,859 | 12/1963 | Fathauer et al. | 358/125 |
| 3,433,895 | 3/1969 | Malkiel | 358/125 |
| 3,651,326 | 3/1972 | Alpers | 358/126 |
| 3,681,528 | 8/1972 | Henderson | 358/125 |
| 3,953,669 | 4/1976 | Saccomani et al. | 358/126 |

*Primary Examiner*—Joseph A. Orsino, Jr.
*Attorney, Agent, or Firm*—Kurt Kelman

[57] ABSTRACT

Disclosed herein are a method for the measurement of physical displacement, including the angular displacement, of a body in motion and an apparatus for use in the method, which method comprises placing on the body a target mark divided by two perpendicularly intersecting lines into four areas which are shaded alternately bright and dark, taking the image of the target mark with an image pickup tube capable of random deflection by having a carrier for circular sweep superposed on a deflection voltage and thereby producing video signals, subjecting the video signals to synchronous rectification with the carrier and a sub-carrier possessing a frequency two times the frequency of the carrier for thereby obtaining mean values, calculating the value of deviation between the centers of the target mark and the circular sweep on the basis of the mean values and feeding the value of deviation back to the image pickup tube to cause the centers of the target mark and the circular sweep to coincide with each other, whereby the positional displacement and the angular displacement of the target mark on the body is measured on a real time basis.

6 Claims, 14 Drawing Figures (A) x-axis deflection carrier (cos ωt)

(B) y-axis deflection carrier (sin ωt)

(C) x-axis sub-carrier (cos 2ωt)

(D) y-axis sub-carrier (sin 2ωt)

(E) Alternating current component of video signal (Vz)

METHOD FOR MEASUREMENT OF DISPLACEMENT OF MOVING BODY BY USE OF TARGET MARK AND APPARATUS THEREFOR

BACKGROUND OF THE INVENTION

This invention relates to a method for the measurement of physical displacement, including positional and angular displacement, of a moving body by tracking the center of a target mark placed on the moving body or of the mark in a series of picture images obtained by high-speed photography and to an apparatus for the measurement of physical displacement.

Among the optical methods which permit non-contact measurement of the physical displacement of moving bodies, there are included a photogrammetric method resorting mainly to high-speed photography and an electron optical method making use of image pickup tubes. Since the former method involves the steps of first subjecting photographic data to manual extraction and then causing the extracted data to be processed in an analyzer, it has the disadvantage that it tends to entail errors, consume much time and fail to provide real-time measurement. In contrast, the latter method permits real-time measurement and, depending on the configuration of the processing apparatus used, can be made capable of simultaneously providing effective recognition of complicated patterns. For the purpose of measurement of simple displacement without respect to directionality, there has been proposed a method which accomplishes extraction of the desired coordinates as by tracking the brightest point of a mark placed on a given moving body by means of an image pickup tube and processing the resultant video signals as with a comparator to obtain the displacement of the body. In actuality, however, when the video signals are to be converted into binary signals using a certain threshold value, the image pickup tube shading caused by a locational irregularity of luminance in the regenerated image and the ambient conditions of the moving body subjected to measurement render the fixing of such threshold value extremely difficult and the realization of collection of accurate data impracticable.

There has also been developed an apparatus which provides desired measurement of physical displacement of a given moving body by placing on the body a specific mark divided into two halves, bright and dark, in the x(horizontal)-direction or the y(vertical)-direction and photographing that mark with an image dissector camera and thereby determining the simple displacement of the body in the x-direction or y-direction (namely, the displacement in the direction perpendicular to the boundary of the bright and dark halves of the mark). This method, however, not merely fails to provide measurement of the angular displacement of the mark but also suffers from the defect that the angular displacement of the mark impedes successful tracking of the mark itself.

An object of this invention is to provide a method and apparatus which permits easy measurement of physical displacement, including angular displacement, of a moving body by causing a target mark placed on the moving body to be tracked with an image pickup tube capable of random deflection.

SUMMARY OF THE INVENTION

To accomplish the object described above according to the present invention, there is provided a method for the measurement of displacement of a moving body having a target mark, which method comprises:

placing on the body a target mark divided by two perpendicularly intersecting lines into four areas, with one pair of diagonally opposed areas shaded bright and the other pair of diagonally opposed areas shaded dark, taking the image of the mark on the body in motion with an image pickup tube capable of random deflection, with the image pickup tube swept circularly by superposing a carrier for circular sweep on the deflection voltage, synchronously rectifying and smoothing the aforementioned carrier and a sub-carrier of a frequency two times the frequency of the carrier with the alternating current component of the video signals obtained by with the image pickup tube, to obtain two sets of values of synchronous rectification, determining the deviation between the centers of the mark and the circular sweep on the basis of the obtained values and feeding the obtained values back to the deflecting system and thereby causing the center of the circular sweep to coincide with the center of the mark, whereby the positional displacement and the angular displacement of the mark are simultaneously detected.

The deflection voltage which occurs when the deviation in terms of mean values is fed back to the deflecting system and the center of the circular sweep is caused to coincide with that of the mark represents the coordinates of the mark. The phase difference which appears between the video signals and the sub-carrier when the center of the circular sweep and that of the mark are caused to coincide with each other represents the inclination of the mark. By this method, not only the positional displacement but also the angular displacement of the target mark can be simultaneously detected and continuously tracked.

The apparatus employed for effecting the method described above, when additionally provided with a circuit possessing a search function capable of imparting a spirally sweeping voltage into the deflecting system, can search out and catch the target mark even when the image pickup tube fails to include an image of any part of the target mark in the zone of the circular sweep.

The synchronous rectification of the video signals with the carrier and the sub-carrier, the arithmetic operation to find the mean values, the processing for the coincidence of the centers of the circular sweep and the mark and, further, the search processing are all carried out electronically, thus making real-time tracking of the target mark possible.

The other objects and characteristics of the present invention will become apparent from the further disclosure of the invention to be given hereinafter with reference to the accompanying drawings.

DESCRIPTION OF THE PREFERRED EMBODIMENTS

This invention relates to a method which permits measurement of physical displacement, including angular displacement, of a moving body bearing a target mark. The method of this invention is particularly effective in analyzing, in terms of positional displacement and angular displacement, the instantaneous motions of automobiles or dummies in experiments on automobile collisions. The applicability of this method is not, however, limited to bodies traveling at high speeds and is equally applicable to the measurement of the physical displacement, including the angular displacement, of bodies in motion at low speeds.

Figures 1A, 1B, 1C:
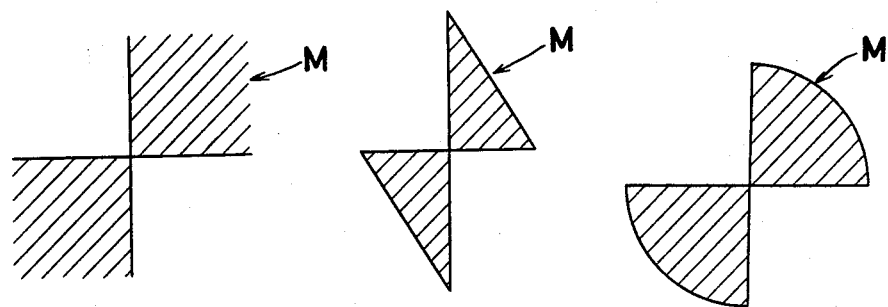
FIGS. 1A–C represent three preferred embodiments of the target mark to be used by the method of this invention for the measurement of the displacement of a body bearing the target mark.

As the first step, a target mark, M is placed on the body whose motion is to be measured. The target mark used in the present invention is divided by two perpendicularly intersecting lines into four areas, with one pair of diagonally opposed areas shaded bright and the other pair of diagonally opposed areas shaded dark. The four areas may be in any of the shapes illustrated in FIGS. 1A-C so far as the aforementioned requirement is fulfilled.

The real-time measurement of the physical displacement of a body in motion is effected as by tracking the target mark M with an image pickup tube capable of random deflection such as an image dissector camera and analyzing the video signals thus obtained. The analysis of the video signals may otherwise be carried out by means of a flying-spot scanner where the target mark is photographed on a roll of a high-speed motion picture film.

Figure 2:
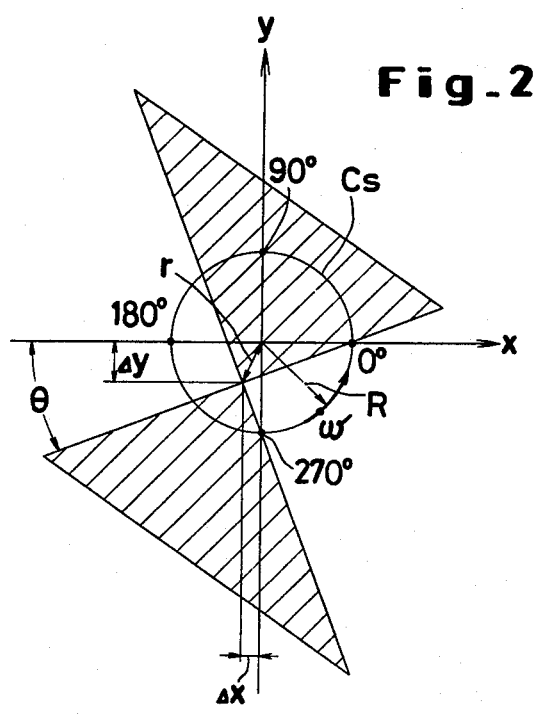
FIG. 2 is an explanatory diagram of the relation between the mark and the circular sweep.

Now, the method for obtaining the desired video signals by taking the image of the target mark with the aforementioned image pickup tube will be described with reference to FIG. 2.

With the image pickup tube, a position selected arbitrarily to include the center of the target mark is swept circularly. This circular sweep $C_s$ is accomplished by superposing the following x-y carriers ((A) and (B) in FIG. 3) as sub-deflection voltages on the x-axis and y-axis deflection voltages.

$$x = R \cdot \cos \omega t$$

$$y = R \cdot \sin \omega t$$

In the equations, R denotes the radius of circular sweep $C_s$ and $\omega$ the angular speed of the sweeping motion.

Figure 3:
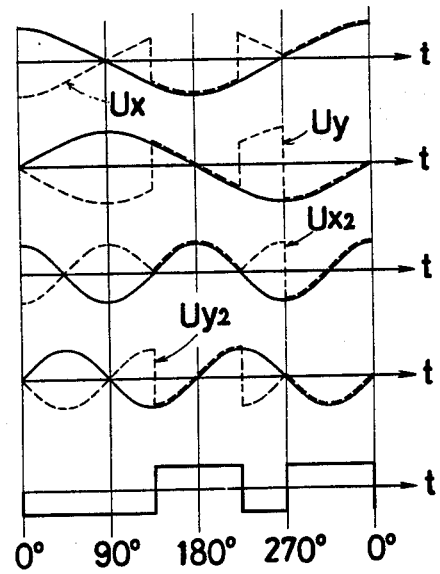
FIGS. 3A-E are explanatory diagrams concerning the processing of wave forms on the basis of the video signals.

From the target mark imaged on the focal plane of the image pickup tube, two cycles of video signals are obtained for each circular sweep. Then, by shaping an alternating current component of the video signals, there is obtained a bistable video signal $V_z$ which represents the contour of the mark ((E) in FIG. 3). Let $U_x$ and $U_y$ stand for the values obtained by the synchronous rectification of the carriers and the bistable video signals, and $U_{x2}$ and $U_{y2}$ stand for the values obtained by the synchronous rectification of the $x_2$-$y_2$ sub-carriers, $$x_2 = R \cdot \cos 2\omega t$$

$$y_2 = R \cdot \sin 2\omega t$$

possessing frequencies two times that of the carrier mentioned above and the bistable video signals (C) and (D) in FIG. 3, and the mean values which are expressed by subjecting to integration processing for one circular sweep the values $U_x$, $U_y$, $U_{x2}$ and $U_{y2}$ obtained as an instantaneous value in the circular sweep will be as follows:

$$\overline{U_x} = -\frac{2}{\pi R}(\Delta x \sin 2\theta + \Delta y \cos 2\theta) \quad (1)$$

$$\overline{U_y} = \frac{2}{\pi R}(\Delta x \cos 2\theta - \Delta y \sin 2\theta) \quad (2)$$

$$\overline{U_{x2}} = \frac{2}{\pi}\left(1 - \frac{r^2}{R^2}\right)\sin 2\theta \quad (3)$$

$$\overline{U_{y2}} = -\frac{2}{\pi}\left(1 - \frac{r^2}{R^2}\right)\cos 2\theta \quad (4)$$

In the equations, $\theta$ represents the inclination of the target mark, $\Delta x$ and $\Delta y$ represent the variate quantities in the x-y coordinates having their origin at the center of the target mark deviating from the center of the circular sweep and r represents the distance $$\sqrt{(\Delta x^2 + (\Delta Y)^2)}$$

from the center of the target mark to the center of the circular sweep.

What should be noted about the formulas (3) and (4) above is the fact that when the distance r from the center of the target mark to the center of the circular sweep diminishes to 0, namely when the two centers come to coincide with each other, the common variable enclosed in parentheses assumes the value of 1, leaving sin $2\theta$ and cos $2\theta$ behind. These components vary in proportion to the mean values $\overline{U_{x2}}$ and $\overline{U_{y2}}$ so that the angular displacement of the target mark because of any inclination of the mark can be determined from $\overline{U_{x2}}$ and $\overline{Y_{y2}}$. In short, from the ratio of the formula (3) to the formula (4), $$\frac{\overline{U_{x2}}}{\overline{U_{y2}}} = \frac{\frac{2}{\pi}\left(1 - \frac{r^2}{R^2}\right)\sin 2\theta}{-\frac{2}{\pi}\left(1 - \frac{r^2}{R^2}\right)\cos 2\theta} = -\tan 2\theta$$

The inclination of the target mark $\theta$ is obtained as $$\text{arc} \cdot \tan -\frac{\overline{U_{x2}}}{\overline{U_{y2}}}.$$

On the condition that the circular sweep is effected with the sub-deflection voltage so as to embrace the center of the mark, the calculation of the mean values obtained by the synchronous rectification mentioned above permits the deviation values $\Delta X$ and $\Delta Y$ representing the deviation of the center of the mark from the center of the circular sweep in the x-axis deflection and the y-axis deflection to be obtained as the deflection-correcting voltages in accordance with the following expressions.

$$\Delta X = \overline{U_x} \cdot \overline{U_{x2}} + \overline{U_y} \cdot \overline{U_{y2}} \quad (5)$$

$$= \frac{4}{\pi^2 R}\left(1 - \frac{r^2}{R^2}\right)\Delta x \quad (6)$$

$$\Delta Y = \overline{U_x} \cdot \overline{U_{y2}} - \overline{U_y} \cdot \overline{U_{x2}}$$

$$= \frac{4}{\pi^2 R}\left(1 - \frac{r^2}{R^2}\right)\Delta y$$

Since $\Delta X$ and $\Delta Y$ vary in proportion to $\Delta x$ and $\Delta y$ within the scope of $r<R$ in which the circular sweep proceeds in such a manner as to embrace the center of the mark, the center of the circular sweep and the center of the mark can be made to coincide with each other by feeding the $\Delta X$ and $\Delta Y$ back to the deflecting system in the image pickup tube. Further, the inclination $\theta$ of the mark can be determined from the aforementioned mean values $\overline{U_{x2}}$ and $\overline{U_{y2}}$.

Figure 4A:
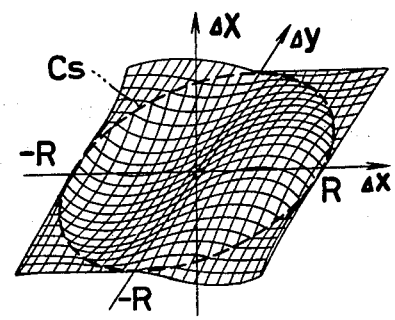
FIGS. 4A-B are diagrams of a three-dimensional analysis showing the magnitudes of the feedback signal voltage required for the compensation of the deflection based on the deviation between the centers of the mark and the circular sweep.
Figure 4B:
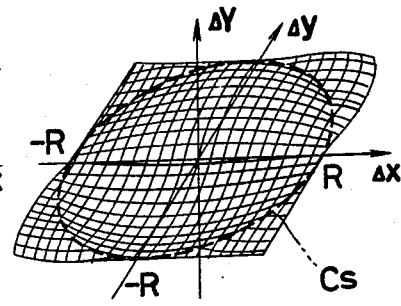

The diagram of the three-dimensional analysis (3DA) in FIG. 4 represents the magnitudes of $\Delta X$ and $\Delta Y$ obtained by plotting the aforementioned $\Delta x$ and $\Delta y$ in the x-y coordinate system and subjecting the plotted magnitudes to simulation on an electronic simulator. It is noted from FIG. 4 that $\Delta X$ assumes plus values in the first and fourth quadrants and $\Delta Y$ assumes plus values in the first and second quadrants. In each of the 3DA diagrams, the zone falling outside the dotted line which represents the boundary of the circular sweep is where the center of the mark is not embraced by the circular sweep. This means that in this zone, desired measurement of the displacement of the mark is not obtained.

The principle of the important function in the method of this invention for the measurement of the displacement of the target mark has been described. An apparatus which successfully executes the method of this invention has already been perfected. Now, the construction of this apparatus will be described in detail with reference to FIG. 5.

In this apparatus, an image dissector camera is used as the image pickup tube capable of random deflection (indicated as "camera 1" in the diagram) which serves to take the image of the mark M.

So far as the circular sweep by the camera 1 is such that the taken image embraces the center of the mark M, the video signal output from the circular sweep is obtained at the rate of two cycles per cycle of the circular sweep, namely, at a frequency two times the frequency of the carrier. This video signal is transferred to the shaping circuit 2 (which may be replaced with an automatic gain control, for example), wherein there is consequently obtained the alternating current component $V_z$ ((E) in FIG. 3) in a pulse train which is not affected by the image pickup tube shading, the variation in the ambient brightness and other similar factors but is proportional to the bright-dark duty cycle. The signal $V_z$ is forwarded to the synchronous rectification circuit 4, wherein it is subjected to synchronous rectification with the carrier and sub-carrier from the carrier generator 3 to determine values of synchronous rectification, $U_x$, $U_y$, $U_{x2}$ and $U_{y2}$. Then, these values are passed through the smoothing circuit 5, wherein they are smoothed to afford the mean values $\overline{U_x}$, $\overline{U_y}$, $\overline{U_{x2}}$ and $\overline{U_{y2}}$. These mean values are forwarded to the operational circuit 6 for calculation of the variate quantities $\Delta X$ and $\Delta Y$ each expressed by the formulas (5) and (6), which represent the deviation of the center of the mark from the center of the circular sweep. The center of the mark and the center of the circular sweep can be made to coincide with each other by feeding the $\Delta X$ and $\Delta Y$ signals from the operational circuit 6 back to the integrator $7c$ also possessing the function of a sample-and-hold circuit. The deflection voltages X and Y which appear before the addition of the carrier represent the center of the mark and the arc·tan $(U_{y2}/U_{x2})$ represents the angular displacement $\theta$ of the mark.

In actuality, however, merely because the camera 1 is directed toward the mark M, it does not necessarily follow that the image can be obtained so as to embrace the center of the mark M within the boundary of the circular sweep. This implies a fair possibility that the camera 1 will fail to issue a desired video signal output possessing a frequency two times the frequency of the carrier and, as a result, the center of the mark will fall in the zone outside the dotted line (boundary of the circular sweep $C_s$) indicated in FIGS. 4A–B, rendering the measurement impracticable. To preclude this possibility, namely to perform the circular sweep in such a manner as to have the center of the mark embraced at all times within the boundary, it suffices to initialize the position of the circular sweep. The mechanism which permits the execution of this initialization is the initializing circuitry 8 in FIG. 5.

The initialization is effected as follows. As the first step, the switch S is turned and set to the IM (initialize mode) side to connect the camera 1 to the raster signal generator 9, with the result that the camera effects raster scanning and displays on the monitor 10 an image including the target mark M. The estimated values e of the coordinates of the target mark in the displayed image can be obtained by touching the target mark on the monitor 10 with a light pen 11. The values retained in the sample-and-hold circuit (S/H) $7d$ are renewed in accordance with the estimated values fed from the monitor. At this point, the switch S is turned and set to the OM (operate mode) side. Consequently, the deflection voltage having the signal from the carrier generator 3 superposed on the estimated values e as the output of S/H $7d$ is applied to the camera 1, causing circular sweep in the neighborhood of the center of the target mark. Thereafter, the aforementioned processing is followed to determine the physical displacement of the mark.

Even when the tracking of the mark based on the initialized estimated values e is started by use of the apparatus of the present invention which is additionally provided with the initializing function of the aforementioned configuration, the initialization is required to be such that the circular sweep will never fail to embrace the center of the mark. This requirement presumes a possibility that the estimated values of the mark will be fixed so roughly in the initialization and, consequently, the circular sweep will fail to embrace the center of the mark or even a part of the mark. To cope with this possibility, there is employed a method which effects automatic search of the mark in the neighborhood of the estimated values.

Figure 5:
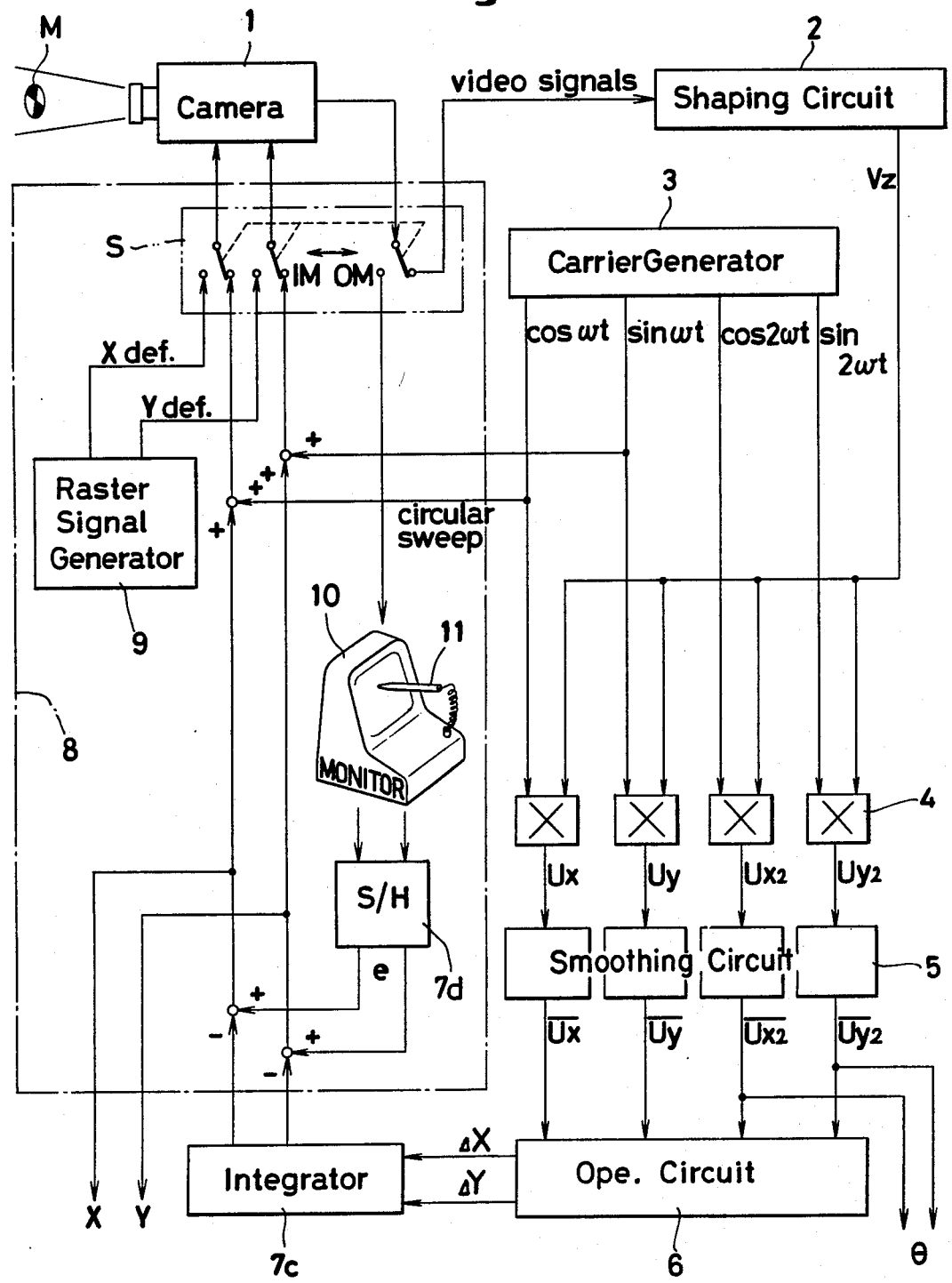
FIG. 5 is a block diagram of an apparatus used for practicing the method of this invention.
Figure 6:
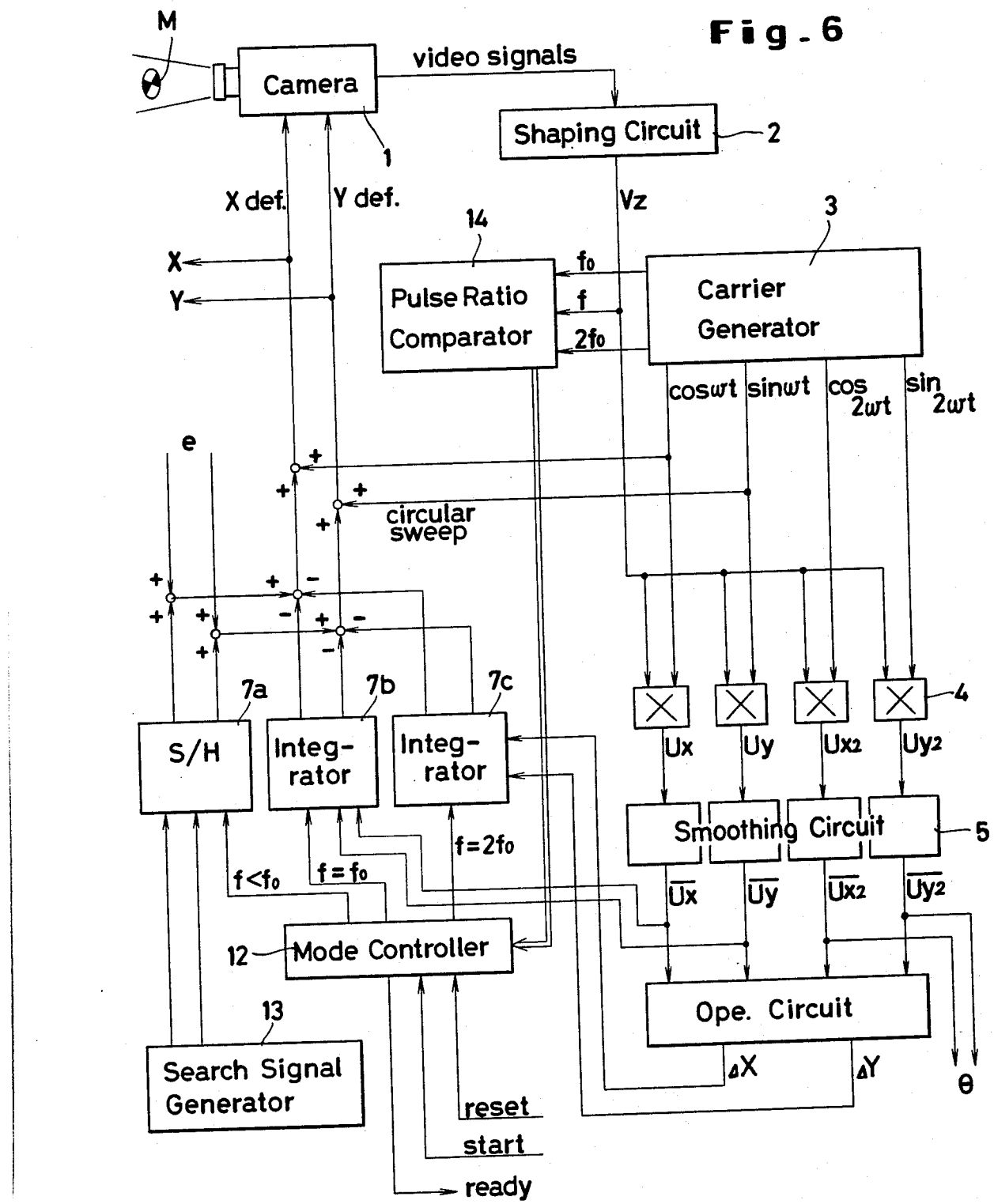
FIG. 6 is a block diagram of another preferred embodiment of an apparatus for practicing the present invention.

FIG. 6 represents addition of such search function to the preferred embodiment of FIG. 5. The circuits denoted by like symbols fulfill with functions. When the coordinates of a point close to the target mark are fixed as estimated values, the apparatus possessing this function is capable of determining, by itself, the coordinates of the center of this target mark even if the circular sweep fails to embrace the center of the mark or a part of the mark. Thus, this apparatus finds utility in various applications. The tracking of a target mark photographed on a high-speed motion picture film constitutes one example. In this case, the images of the mark in the strip of picture frames are such that the amount of motion of the mark per frame is generally small enough for the mark to be safely regarded as producing a motion of constant acceleration. Thus, the estimation of the current amount of motion can easily be obtained on the basis of the varying coordinates in the last three frames. The accurate coordinates of the mark close to the estimated values, therefore, can be obtained by feeding the apparatus with the stationary images of the mark on the motion picture film and applying thereto the estimated values obtained as described in the preceding preferred embodiment. By repeating the step described above, the coordinates of the target mark in the sequential frames of the high-speed motion picture film can be measured.

The apparatus of FIG. 6 which is adapted to accomplish this sequential measurement of the coordinates of the mark is provided with the following three modes: PRESET (initialize), OPERATE and READ-OUT.

In the PRESET mode, when a reset signal is fed into a mode controller 12 as through an external CPU (Central processing unit; not shown), the sample-and-hold circuit (S/H) 7a and the integrators 7b and 7c also possessing the function of a sample-and-hold circuit are caused to assume the status of HOLD or RESET, with the result that the values formerly set in the circuits and the amplitude of search signal in S/H 7a are cleared. In this state, the estimated values e of the x-y coordinates of the target mark are introduced as input. Then, through the external CPU, the PRESET mode is shifted to the OPERATE mode by introducing the start signal as the input to the controller 12. As the OPERATE mode has assumed the state ready for processing, a READY signal is issued. The positional relationship between the target mark and the circular sweep at the estimated values is such that there exist the following three possible states: (A) The circular sweep does not intersect the boundary of the mark, (B) it intersects the boundary of the mark but fails to embrace the center of the mark and (C) it embraces the center of the mark. Each of the states can be discerned by comparing the frequency f of the alternating current component $V_z$ representing the boundary of the mark with the frequencies $f_0$ and $2f_0$, of the carrier and sub-carrier.

Let us now assume that there has occurred the state "A" wherein the circular sweep does not intersect with even the boundary of the mark. In this case, no boundary pulse (the alternating current component of the video signals) is issued. As a countermeasure, a pulse ratio comparator 14 adapted to compare the signals, $f_0$ ($=\omega/2\pi$, and $2f_0$ from the carrier generator 3 with the frequency f of the video signals to generate a control signal for a mode controller 12 is incorporated so that, when the frequency f of the video signals is less than the signal $f_0$ ($f < f_0$), S/H 7a is turned "ON" by the signal fed from the mode controller 12 to superpose the search voltage from the search voltage generator 13 on the deflection voltage as illustrated in FIG. 6. This search voltage satisfies the following equations.

$$x = R(t) \cdot \cos \omega_s t$$

$$y = R(t) \cdot \sin \omega_s t$$

Figure 7:
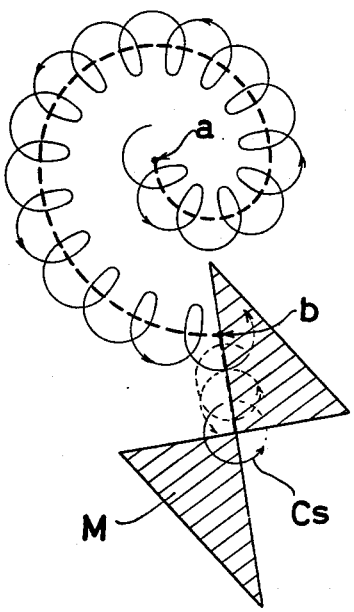
FIG. 7 is an explanatory diagram showing the operating principle of the preferred embodiment of FIG. 6.

In the equations, $\omega_s$ fulfills the relationship of $\omega_s \ll \omega$ and R(t) represents the ramp voltage. Consequently, the deflection having the circular deflection superposed on the vortex deflection (the locus of the dotted line a→b in FIG. 7) assumes a spiral shape. The pulse train of the video signals, therefore, assumes the frequency $f_0$ ($f = f_0$: state "B") when this spiral deflection collides into the edge (point b in FIG. 7) of the target mark. In other words, at this point, S/H 7a is set to HOLD and, at the same time, the integrator 7b is set to OPERATE and the mean values $\overline{U_x}$ and $\overline{U_y}$ from the smoothing circuit 5 are fed back to the deflecting system. Consequently, the center of the circular sweep coincides at all times with the boundary of the target mark. If the leak current from S/H 7a causes the center of the circular sweep to shift its position on the boundary of the mark, the frequency of the alternating current component $V_z$ comes to satisfy the equation $f = 2f_0$ (state "C") when the sweep proceeds to the zone containing the center of the target mark. In this state, the integrator 7b is set to HOLD and the integrator 7c is set to OPERATE. From this point on, the procedure continues to that of FIG. 5. Consequently, the values $\Delta X$ and $\Delta Y$ are fed back to the deflecting system and the center of the circular sweep comes to coincide with the center of the target mark, rendering the measurement of X, Y and $\theta$ possible.

As described in detail above, the present invention permits the positional displacement and the angular displacement of the target mark to be simultaneously measured on a real time basis. While in conventional methods for measuring physical displacement, difficulties arose because of the need to process video signals including a direct current component, the present invention which attaches emphasis only to the phase relation between the video signal and the carrier has the advantage that the measurement by this invention precludes the adverse effect of image pickup tube shading the obviates the necessity for the incorporation of a threshold level.

What is claimed is:

1. A method for the measurement of the displacement of a moving body by use of a target mark placed on the body, which target mark has two quarter shaded dark areas symmetrically opposed to each other, comprising the steps of:
   (a) taking the image of the target mark with an image pickup tube by causing carriers for circular sweep to be respectively superposed on the relative deflection voltages, thereby to produce video signals;
   (b) shaping an alternating current component of the video signals to produce a bistable video signal;
   (c) subjecting said bistable video signal with each of said carriers and with sub-carriers having a frequency two times that of said carriers to synchronous rectification and smoothing, thereby to produce mean values ($\overline{U_x}$ and $\overline{U_y}$) for said carriers and mean values ($\overline{U_{x2}}$ and $\overline{U_{y2}}$) for said sub-carriers, the ratio of said mean values for the sub-carriers being equivalent to the angular displacement;
   (d) calculating the deviation values ($\Delta X$ and $\Delta Y$) of the center of the target mark from the center of the circular sweep in accordance with the formulas:

$$\Delta X = \overline{U_x} \cdot \overline{U_{x2}} = \overline{U_y} \cdot \overline{U_{y2}}$$

$$\Delta Y = \overline{U_x} \cdot \overline{U_{y2}} = \overline{U_y} \cdot \overline{U_{x2}};$$

and (e) feeding back to the deflecting system of the image pickup tube said deviation values as deflection-correcting voltages, thereby to cause the center of the circular sweep to coincide with that of the target mark, whereby the positional displacement of the target mark is determined on the basis of said deviation values and the angular displacement is determined on the basis of said mean values for the sub-carriers.

2. The method according to claim 1, further comprising the step of effecting an initialization operation for initializing the position of the circular sweep, which operation is carried out by causing the image pickup tube to effect raster scanning the causing estimated values of the coordinates of the target mark in an image taken as a result of the raster scanning to be superposed on the deflection voltages and to be fed to the deflecting system of the image pickup tube.

3. The method according to claim 1, further comprising the steps of effecting a searching operation for the target mark when the circular sweep of the image pickup tube fails to intersect the boundary of the target mark, which operation is carried out by causing search deflection voltages produced as a result of superposing the vortex deflection voltages on the carriers for circular sweep to be supplied to the deflecting system of the image pickup tube; discontinuing the searching operation by terminating the superposition of the vortex deflection voltages on the carriers for circular sweep at the time the search scanning catches the target mark as a result of said searching operation; and feeding back to the deflecting system mean values derived by subjecting to the synchronous rectification the bistable video signal and the carriers, thereby causing the circular sweep to intersect with the boundary of the target mark; whereby the image pickup tube searches out the target mark.

4. An apparatus for the measurement of the displacement of a moving body by use of a target mark placed on the body, which target mark has two quarter shaded dark areas symmetrically opposed to each other, comprising:

(a) a carrier generator for generating carriers possessing a specific frequency and sub-carriers each having a frequency two times that of said carriers;

(b) an image pickup tube capable of random deflection and adapted to accomplish circular sweep by superposing said carriers from said carrier generator on the deflection voltages, thereby to obtain video signals;

(c) a shaping circuit for shaping an alternating current component of the video signals fed from the image pickup tube to produce a bistable video signal;

(d) a synchronous rectification circuit for subjecting said bistable video signal with each of said carriers and with each of said sub-carriers to synchronous rectification thereby to produce synchronous rectification values ($U_x$ and $U_y$) for said carriers and values ($U_{x2}$ and $U_{y2}$) for said sub-carriers;

(e) a smoothing circuit for smoothing each of the synchronous rectification values thereby to produce mean values ($\overline{U_x}$ and $\overline{U_y}$) for the carriers and mean values ($\overline{U_{x2}}$ and $\overline{U_{y2}}$) for the sub-carriers, the ratio of said mean values for the sub-carriers being equivalent to the angular displacement;

(f) an operational circuit for calculating the deviation values ($\Delta X$ and $\Delta Y$) of the center of the target mark from the center of circular sweep in accordance with the formulas:

$$\Delta X = \overline{U_x} \cdot \overline{U_{x2}} + \overline{U_y} \cdot \overline{U_{y2}}$$

$$\Delta Y = \overline{U_x} \cdot \overline{U_{y2}} = \overline{U_y} \cdot \overline{U_{x2}};$$

and (g) an integrator for producing the deflection-correcting voltages in proportion to the deviation values derived from the operational circuit, and feeding back to the deflecting system of the image pickup tube the deflection-correcting voltages with the carriers for circular sweep, whereby the center of the circular sweep coincides with that of the target mark to determine the positional displacement on the basis of said deflection voltages and the angular displacement on the basis of the mean values for the sub-carriers.

5. The apparatus according to claim 4, which further comprises initializing circuitry for initializing the position of the circular sweep of the image pickup tube, which circuitry has a raster signal generator for causing the image pickup tube to effect raster scanning under the initialization mode, a monitor capable of reproducing the image taken by the image pickup tube and outputting estimated values under the initialization mode, and a sample-and-hold circuit for retaining the estimated values which is renewed in accordance with the values from the monitor and caused to be superposed on the deflection voltages and to be fed to the deflecting system of the image pickup tube when the initialization mode is terminated.

6. The apparatus according to claim 4, wherein circuitry having a search function made operative when the circular sweep fails to embrace the center of the target mark is additionally provided therein, which circuitry comprises:

a pulse ratio comparator for comparing the frequency of the video signals from the image pickup tube with the frequencies of the carriers and the sub-carriers from the carrier generator to generate a control signal;

a sample-and-hold circuit effected when the frequency of the video signals is less than that of said carriers, to cause the search deflection voltage produced by superposing on the carriers for circular sweep the vortex deflection voltages to be supplied to the deflecting system of the image pickup tube in response to the control signal fed from the comparator, thereby to fulfill a search operation for causing the sweeping on the image pickup tube to collide into the edge of the target mark; and another integrator effected by receiving the control signal from the pulse ratio comparator when the frequency of the video signals is equal to that of said carriers as a result of the collision of the sweeping into the edge of the target mark, to feed back to the deflecting system of the image pickup tube said mean values for said carriers derived from said smoothing circuit, thereby causing the center of the circular sweep to shift its position on the boundary of the target mark in the direction of the center of the target mark due to the leak current from said sample-and-hold circuit until the center of the circular sweep comes to coincide with the center of the mark with the result that the frequency of the video signals is equal to that of said sub-carriers to allow said integrator for producing the deflection-correcting voltage to be set into operation, whereby the target mark is searched out even when the circular sweep fails to embrace the target mark.

* * * * *